US012298166B2

(12) United States Patent
Choi et al.

(10) Patent No.: US 12,298,166 B2
(45) Date of Patent: May 13, 2025

(54) APPARATUS FOR SUPPLYING LIQUID AND SYSTEM FOR SUPPLYING LIQUID INCLUDING THE SAME

(71) Applicant: SAMSUNG ELECTRONICS CO., LTD., Suwon-si (KR)

(72) Inventors: Won Je Choi, Suwon-si (KR); Hyungtae Seo, Suwon-si (KR); Wooram Hong, Suwon-si (KR); Jeonghun Kim, Suwon-si (KR); Taesin Ha, Suwon-si (KR); Youngjin Park, Suwon-si (KR); Hyun Do Choi, Suwon-si (KR); Dal Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 18/097,849

(22) Filed: Jan. 17, 2023

(65) Prior Publication Data
US 2023/0366714 A1    Nov. 16, 2023

(30) Foreign Application Priority Data
May 16, 2022  (KR) .................. 10-2022-0059519

(51) Int. Cl.
G01F 11/02    (2006.01)
B05B 9/04     (2006.01)
B05B 9/08     (2006.01)

(52) U.S. Cl.
CPC .......... *G01F 11/027* (2013.01); *B05B 9/0413* (2013.01); *B05B 9/0838* (2013.01)

(58) Field of Classification Search
CPC ...... B05B 9/047; B05B 9/0413; B05B 9/0838
(Continued)

(56) References Cited

U.S. PATENT DOCUMENTS

RE25,113 E  *  1/1962  Wilburn ................. A61M 5/28
                                                 604/199
4,399,980 A    8/1983  van Schie
(Continued)

FOREIGN PATENT DOCUMENTS

EP    0720491 B1    8/2003
EP    2197589 B1    2/2011
(Continued)

OTHER PUBLICATIONS

Steiner, S. et al., "Organic synthesis in a modular robotic system driven by a chemical programming language", Science, Vo. 363, Issue 6423, Nov. 29, 2018, 25 pages.
(Continued)

*Primary Examiner* — Cody J Lieuwen
(74) *Attorney, Agent, or Firm* — Sughrue Mion, PLLC

(57) ABSTRACT

A liquid supply apparatus includes: a chamber configured to contain a liquid; an injector disposed on a first side of the chamber and configured to spray the liquid; and a piston extending from a second side of the chamber toward an interior of the chamber, wherein the chamber includes a first area configured to store the liquid; and a second area between the first area and the injector, and wherein the piston is configured to selectively seal or transfer the liquid between the first area and the second area, and press the liquid in the second area to expel the liquid from the liquid supply apparatus.

9 Claims, 14 Drawing Sheets

(58) Field of Classification Search
USPC .......................................................... 239/321
See application file for complete search history.

(56) References Cited

U.S. PATENT DOCUMENTS

| | | | | |
|---|---|---|---|---|
| 5,531,705 | A * | 7/1996 | Alter ..................... | A61M 5/322 |
| | | | | 604/110 |
| 6,221,055 | B1 * | 4/2001 | Shaw ..................... | A61M 5/24 |
| | | | | 604/218 |
| 6,416,242 | B1 | 7/2002 | Kaufmann | |
| 6,585,695 | B1 | 7/2003 | Adair et al. | |
| 7,374,678 | B2 | 5/2008 | Leach et al. | |
| 7,837,943 | B2 * | 11/2010 | Jeong ..................... | G01N 1/14 |
| | | | | 422/534 |
| 7,845,499 | B2 | 12/2010 | Higgins et al. | |
| 7,927,303 | B2 | 4/2011 | Wyrick | |
| 8,596,555 | B2 | 12/2013 | Thompson et al. | |
| 9,623,198 | B2 | 4/2017 | Kamen et al. | |
| 10,080,468 | B2 | 9/2018 | Ciavarella et al. | |
| 10,166,329 | B2 | 1/2019 | Kamen et al. | |
| 10,245,597 | B2 | 4/2019 | Didden et al. | |
| 10,959,552 | B2 | 3/2021 | Nichols et al. | |
| 11,021,314 | B2 | 6/2021 | Tolman et al. | |
| 2014/0263738 | A1 * | 9/2014 | Aguilar ............... | F16K 31/1221 |
| | | | | 137/15.01 |
| 2018/0141067 | A1 * | 5/2018 | Venditti ................. | A47K 11/10 |
| 2018/0192933 | A1 * | 7/2018 | Anitua Aldecoa ........... | |
| | | | | A61B 5/150351 |
| 2020/0164148 | A1 * | 5/2020 | Bunsick .............. | A61M 5/3148 |
| 2021/0093788 | A1 * | 4/2021 | Fabrigas ............... | A61M 39/10 |

FOREIGN PATENT DOCUMENTS

| | | |
|---|---|---|
| EP | 1579924 B1 | 12/2011 |
| EP | 2238963 B1 | 6/2013 |
| EP | 2061543 B1 | 10/2017 |
| EP | 3320870 B1 | 7/2019 |
| EP | 2430457 B1 | 11/2019 |
| EP | 2539719 B1 | 12/2019 |
| JP | 2005103274 A | 4/2005 |
| KR | 100481418 B1 | 9/2005 |
| KR | 1020110075968 A | 7/2011 |
| KR | 1020120103859 A | 9/2012 |
| KR | 101314645 B1 | 10/2013 |
| KR | 102225578 B1 | 3/2021 |

OTHER PUBLICATIONS

Burger, B., et al., "A Mobile Robotic Chemist", Nature, 583(7815), Jul. 8, 2020, 21 pages.

* cited by examiner

APPARATUS FOR SUPPLYING LIQUID AND SYSTEM FOR SUPPLYING LIQUID INCLUDING THE SAME

CROSS-REFERENCE TO RELATED APPLICATION

This application claims priority to Korean Patent Application No. 10-2022-0059519, filed on May 16, 2022, at the Korean Intellectual Property Office, the disclosure of which is incorporated herein by reference in its entirety.

BACKGROUND

1. Field

Example embodiments of the present disclosure relate to an apparatus for supplying a liquid and a system for supplying a liquid including the same.

2. Description of Related Art

Traditional syringes are simple reciprocating pumps including a plunger (or piston) that fits tightly within a cylindrical tube called a barrel. The plunger can be linearly pulled and pushed along the inside of the tube, allowing the syringe to take in and expel liquid or similar fluid through a discharge orifice at the front (open) end of the tube. The open end of the syringe may be fitted with a hypodermic needle, a nozzle or tubing to direct flow of fluid into and out of the barrel. Syringes are frequently used in clinical medicine to administer injections, infuse intravenous therapy into the bloodstream, apply compounds such as glue or lubricant, and draw/measure liquids. Syringes may be used in a variety of non-medical applications such as drawing in and dispensing liquid food ingredients (additives, cooking oil, soy sauce, etc.) used in cooking applications.

While syringes are generally effective at dispensing liquids, their ability to store liquids are typically limited by size constraints. Accordingly, the functions storing of liquids in a container and dispensing a part of that stored liquid are typically performed by separate apparatuses (e.g., a syringe and a storage container). As an example, liquid may be stored in a container and dispensed by a pipette or a spoon.

Some apparatuses are designed perform both storing and dispensing functions. For example, containers used for cooking, such as containers for soy sauce and cooking oil, can be made of flexible materials so that a single container may be used for both storing and dispensing. Toy water guns also are typically arranged single apparatus for both storing and dispensing. Additionally, as previously mentioned, while syringes are predominantly used for dispensing, they can also be used for some limited storage functions.

The above described apparatuses for designed for both storage and dispensing may be difficult to incorporate into automated systems (e.g., automated assembly lines). For example, consistent dispensing with a flexible container may be difficult due to the container's non-linear characteristics. For designs similar to toy water guns, the structure of the container may be complicated, making it difficult to use multiple containers. However, syringes have a simple structure and can execute quantitative dispensing just by quantitative transfer of the plunger.

If an apparatus such as a syringe is used to store liquid, the liquid can be precisely dispensed without opening the container or requiring additional steps. Mass production of syringes is relatively easy due to the its simple structure. Additionally, it is easy to dispose syringes of after the liquid is used up.

However, there are several disadvantages/limitations for using traditional syringes as liquid storage and dispensation devices, for example, in automated systems. For example, in a structure such as that of a syringe, a plunger applies pressure on the entire fluid inside and sends it to the needle on the opposite side. Liquids with a characteristic close to a incompressible fluid, such as water, are discharged rapidly from the needle according to the pressure of the plunger. However, liquids which have compressive characteristics, such as organic reagents for chemistry, may take a long time to be discharged from the needle after pressure is applied. More time is consumed with more liquid volume inside the syringe, so accurate dispensing is difficult. Thus syringe volume may need to be selected in proportion to the volume of the reagent to be dispensed.

Additionally, when precise dispensing is necessary with a large volume of liquid inside the syringe, liquid volume for storage and for pressurization may be separated. When using such a method, a valve may be used between the storage space and pressurization space. The valve opens when moving the reagent from the storage space to the pressurization space, and closes during pressurization. However, incorporation of a valve complicates the structure of the syringe. Moreover, when moving the fluid from the storage space to the pressurization space, it is difficult to handle the air inside the storage container, so the air may enter the pressurization space, making precise dispensing difficult.

SUMMARY

Provided are an apparatus for supplying a liquid and a system for supplying a liquid including the same.

One or more example embodiments may address at least the problems and/or disadvantages described above, and other disadvantages not described above. Also, the example embodiments are not required to overcome and may not overcome any of the problems and disadvantages described above.

According to an aspect of an example embodiment, a liquid supply apparatus includes: a chamber configured to contain a liquid; an injector disposed on a first side of the chamber and configured to spray the liquid; and a piston extending from a second side of the chamber toward an interior of the chamber, wherein the chamber includes a first area configured to store the liquid; and a second area between the first area and the injector, and wherein the piston is configured to selectively seal or transfer the liquid between the first area and the second area, and press the liquid in the second area to expel the liquid from the liquid supply apparatus.

A width of the second area may be less than a width of the first area.

The chamber may further includes a third area between the first area and the second area, and a width of the third area may decrease from the first area to the second area.

The liquid supply apparatus may further include a cap provided on the second side of the chamber and having an opening, the piston may be movably disposed within the opening, and the piston may be further configured to open or block a flow path, through which a gas is selectively flowable from an exterior of the chamber to the interior of the chamber, by a relative movement of the piston with respect to the cap.

The cap may include a first protrusion extending along an inner side surface of the opening, and the piston may include a second protrusion extending along an outer side surface of the piston.

When the piston is disposed at a first position, the first protrusion of the cap and the second protrusion of the piston may contact each other to block the flow path, so that the gas is blocked from flowing from the exterior of the chamber to the interior of the chamber.

When the piston is disposed at a second position, the first protrusion of the cap and the second protrusion of the piston may be spaced apart from each other to open the flow path between the inner side surface of the opening and the outer side surface of the piston, so that the gas is flows from the exterior of the chamber to the interior of the chamber.

A first groove may be provided in a first portion of an inner side surface of the opening, the piston may include a protrusion extending along an outer side surface of the piston, and a second groove may be provided in a portion of the third protrusion.

When the piston is disposed at a first position, a second portion of the inner side surface of the opening and the protrusion of the piston may contact each other to block the flow path, so that a gas is blocked from flowing from the exterior of the chamber to the interior of the chamber.

When the piston is disposed at a second position, the first groove and the second groove face each other to open the flow path between the inner side surface of the opening and the outer side surface of the piston, so that the gas flows from the exterior of the chamber to the interior of the chamber.

A first groove may be provided in a portion of the second area of the chamber, and a second groove may be provided in a portion of an outer side surface of a lower portion of the piston.

When the piston is disposed at a first position, the first groove and the second groove may face each other, so that a flow path is formed between the third area and the second area via the second groove.

The liquid supply apparatus may further include an additional chamber configured to be in fluid communication with the chamber.

The liquid supply apparatus may further include a holder provided on an upper side of the cap, and separation of the piston from the cap may be selectively preventable by the holder.

The cap may include: an internal storage chamber configured to contain an inert gas; and a first valve configured to connect the internal storage chamber of the cap to the first area of the chamber so that the inert gas is flowable from the storage volume to the first area through the first valve.

The cap may further include a second valve disposed on an upper end of the cap through which the inert gas is to be supplied to the internal storage chamber.

The liquid supply apparatus may further include a valve provided on the second area and configured to allow the liquid to flow from the second area in one direction toward the injector.

According to an aspect of an example embodiment, a liquid supply system includes: a liquid supply apparatus configured to spray a liquid; and a controller configured to control the liquid supply apparatus, wherein the liquid supply apparatus includes: a chamber including a first area configured to store a liquid and a second area configured to spray the liquid; and a piston configured to selectively seal or transfer the liquid between the first area and the second area, and press the liquid in the second area to expel the liquid from the liquid supply apparatus, and wherein the controller is further configured to control movement of the piston.

A width of the second area may be less than a width of the first area, and the chamber may further include: a third area between the first area and the second area, and a width of the third area decreases from the first area to the second area.

The liquid supply apparatus may further include a cap provided on an upper side of the chamber and having an opening, the piston may be movably disposed in the opening, and the piston may be further configured to open or block a flow path, through which a gas is selectively flowable from an exterior of the chamber to an interior of the chamber, by a relative movement of the piston with respect to the cap.

BRIEF DESCRIPTION OF THE DRAWINGS

The above and/or other aspects will be more apparent from descriptions of certain example embodiments referring to the accompanying drawings, in which.

DETAILED DESCRIPTION

Figure 1:
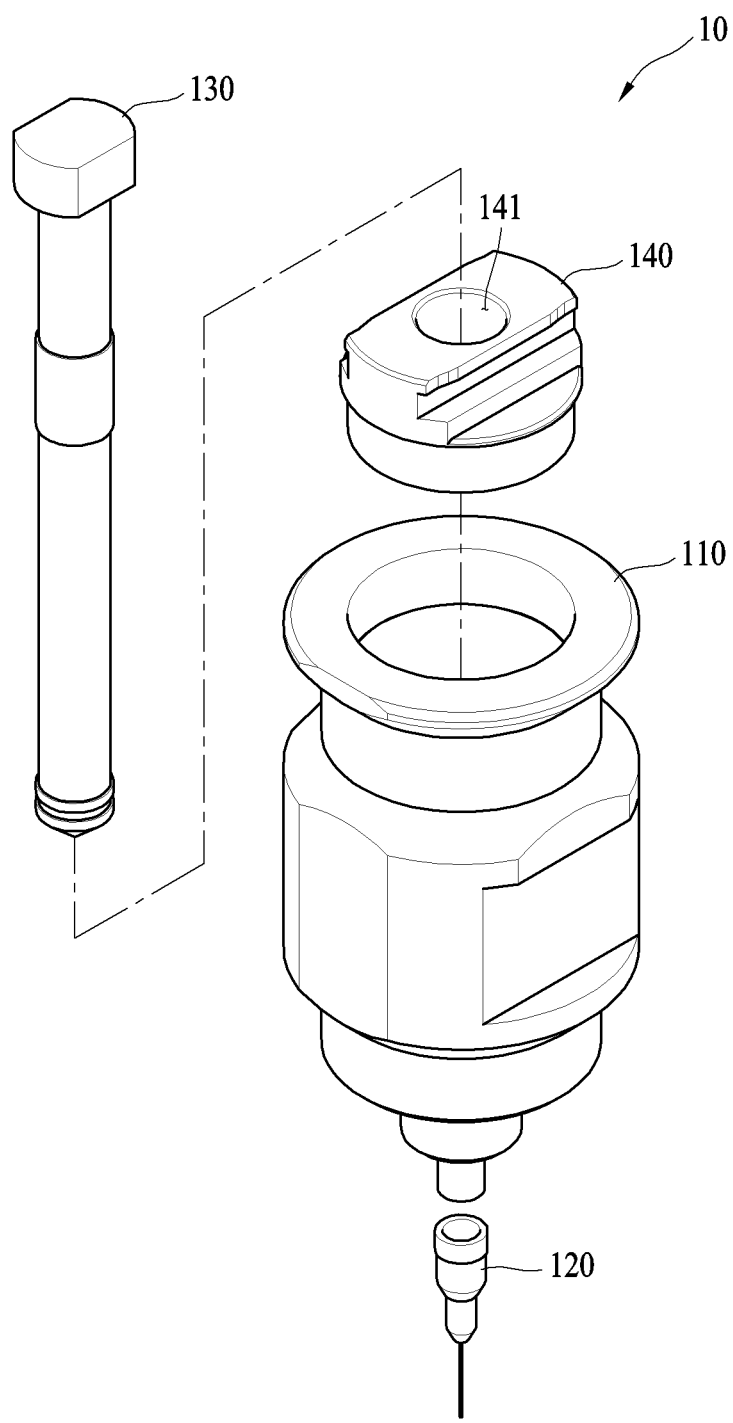
FIG. 1 is an exploded view of a liquid supply apparatus according to various example embodiments.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise defined herein, the descriptions of the example embodiments may be applicable to the following example embodiments and a repeated description related thereto will be omitted for conciseness.

Figure 2:
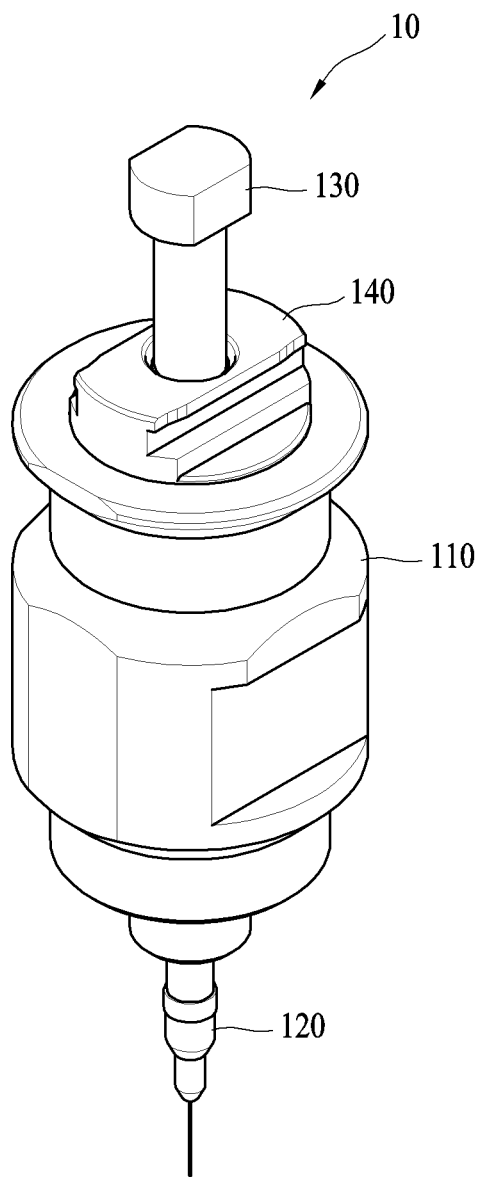
FIG. 2 is a perspective view of a liquid supply apparatus according to various example embodiments.

FIGS. 1 and 2 are an exploded view and a perspective view of a liquid supply apparatus according to various example embodiments, respectively.

Referring to FIGS. 1 and 2, a liquid supply apparatus 10 may include a chamber 110 containing a liquid, an injector 120 disposed on one side (e.g., a lower side) of the chamber to spray the liquid, a piston 130 formed to extend from the other side (e.g., an upper side) of the chamber 110 toward an inside of the chamber, and a cap 140 disposed on the other side of the chamber 110 and having an opening 141.

In some embodiments, the liquid may be water, but examples are not limited thereto, and it is obvious that various types of liquid may be provided. For example, the liquid may be an incompressible or compressible liquid.

In some embodiments, the piston 130 may vertically move when disposed into the opening 141 to form a first flow path (which may be opened or blocked by a relative movement of the piston 130 with respect to the cap 140). A mechanism for the first flow path is described in detail below.

A gas may selectively flow from an outside of the chamber 110 to an inside of the chamber 110 via the first flow path. For example, in response to the first flow path being blocked (e.g., see blockage preventing flow path G1 in FIG. 5C) by the relative movement of the piston 130 with respect to the cap 140, the gas may not flow from the outside of the chamber to the inside of the chamber, and in response to the first flow path being opened (e.g., see opening allowing flow path G1 in FIG. 5B) by the relative movement of the piston 130 with respect to the cap 140, the gas may flow from the outside of the chamber to the inside of the chamber.

In some embodiments, the gas may be air, but examples are not limited thereto, and various types of gas may be provided.

Figure 3:
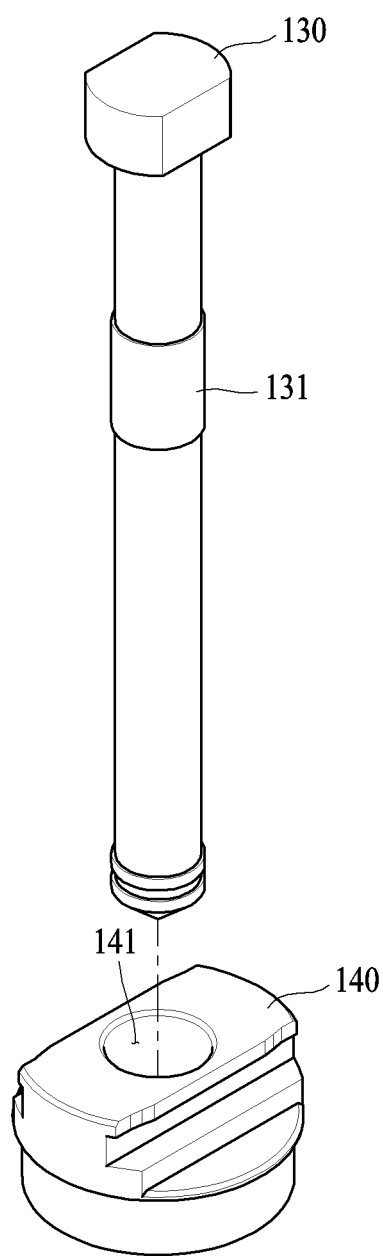
FIG. 3 illustrates a cap and a piston according to an example embodiment.
Figure 4:
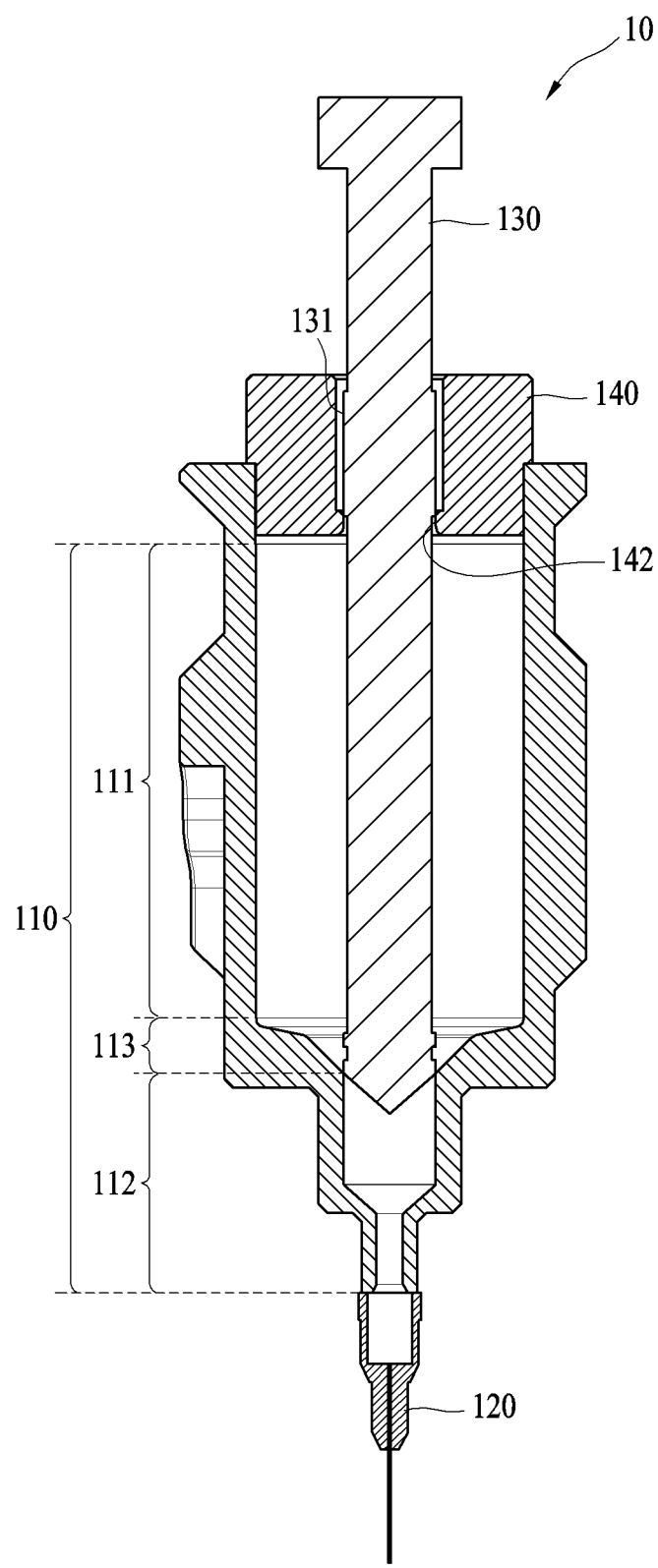
FIG. 4 is a cross-sectional view of a liquid supply apparatus including the cap and piston of FIG. 3.

FIGS. 3 and 4 illustrate the liquid supply apparatus 10 including the piston 130 and the cap 140 according to an example embodiment.

Referring to FIGS. 3 and 4, a first protrusion 142 may be formed along an inner side surface of the opening of the cap 140 of the liquid supply apparatus, and a second protrusion 131 may be formed along an outer side surface of the piston 130.

In addition, the chamber 110 may include a first area 111 configured to store the liquid, a second area 112 disposed between the first area 111 and the injector 120, and a third area 113 disposed between the first area 111 and the second area 112.

In some embodiments, a width of the second area 112 may be less than a width of the first area 111, and a width of the third area 113 may gradually decrease from the first area 111 to the second area 112.

A related art liquid supply apparatus includes a chamber with an interior of uniform width. Since a width of a piston in a related art liquid supply apparatus matches that of interior chamber, pressing of the piston results in an expulsion of an entire amount of a liquid contained in the chamber. With this structure, while an incompressible liquid, such as water, may be rapidly discharged in response to movement of a piston, it may take a long time for a compressible liquid, such as a chemical organic reagent, to be sprayed after pressure is applied by the movement of piston. In particular, it may take more time to spray a large amount of liquid contained in the liquid supply apparatus, making accurate spraying difficult.

in contrast to the structure and operation of traditional liquid supply apparatuses, the improved liquid supply apparatus allows for particular advantages. For example, when an area in the chamber 110 is divided into the first area 111 for storing a liquid and the second area 112 for intensively transmitting the pressure applied by the piston 130 to the liquid, it may be possible to store a large amount of liquid in the liquid supply apparatus and spray an accurate amount of liquid.

Accordingly, a pressing force from movement of the piston may be transmitted only to the liquid contained in the second area 112 not to the liquid contained in the first area 111. Accordingly, the pressing force may be concentrated only on the small amount of liquid contained in the second area 112.

In this case, the liquid may stably move from the first area 111 to the second area 112 through a structure of the third area 113, and a lower portion of the piston may also be stably guided into the second area 112.

Hereinafter, an operating status of the liquid supply apparatus including a cap and a piston is described with reference to FIGS. 5A through 5D.

Figure 5:
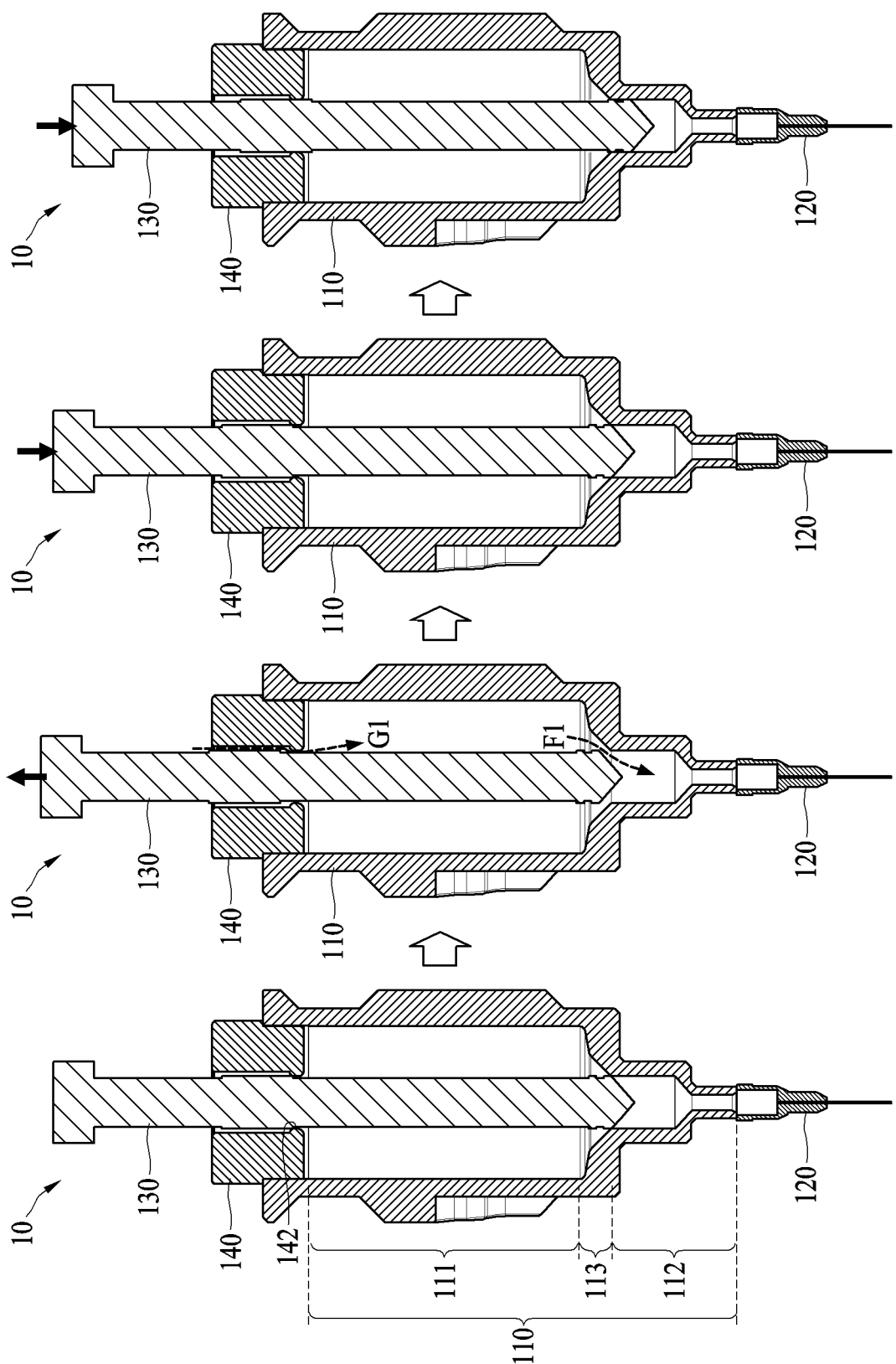
FIGS. 5A through 5D are diagrams illustrating an operating status of the liquid supply apparatus of FIG. 4.

Referring to FIG. 5A, the piston 130 may be disposed at a preset first position with respect to the cap 140. In this case, an outer circumferential surface of a lower portion of the piston 130 may be contact with an inner side surface of the second area 112. In addition, the first protrusion 142 of the cap 140 and the second protrusion 131 of the piston 130 may be in contact with each other.

Accordingly, a liquid contained in the first area 111 and the third area 113 may not flow to the second area 112, and a first flow path to be formed between the cap 140 and the piston 130 is blocked, so that a gas may not flow from an outside of a chamber to an inside of the chamber.

Referring to FIG. 5B, as the piston 130 moves upward with respect to the cap 140, the piston 130 may be disposed at a second position. In this case, the circumferential surface of the lower portion of the piston 130 may be spaced apart from the inner side surface of the second area 112. In addition, the first protrusion 142 of the cap 140 and the second protrusion 131 of the piston 130 may be spaced apart from each other.

In this second position, a liquid contained in the first area 111 and the third area 113 may flow F1 to the second area 112, and the first flow path G1 to be formed between the cap 140 and the piston 130 may be in an opened state. The gas may flow from the outside of the chamber to the inside of the chamber via the opened first flow path G1.

This structure is simple and allows an external gas to be introduced into the chamber without a separate valve component.

Referring to FIG. 5C, as the piston 130 moves downward with respect to the cap 140, the piston 130 may be disposed at the first position again. As a result, the liquid contained in the first area 111 and the third area 113 may not flow back to the second area 112, and the first flow path to be formed between the cap 140 and the piston 130 may be in a blocked state again.

Referring to FIG. 5D, as the piston 130 moves further downward below the first position, the lower portion of the piston may be accommodated in the second area 112. Accordingly, a pressing force from movement of the piston may be intensively transmitted only to the liquid contained in the second area 112. The liquid contained in the second area may be sprayed outwardly from the liquid supply apparatus via the injector 120.

Figure 6:
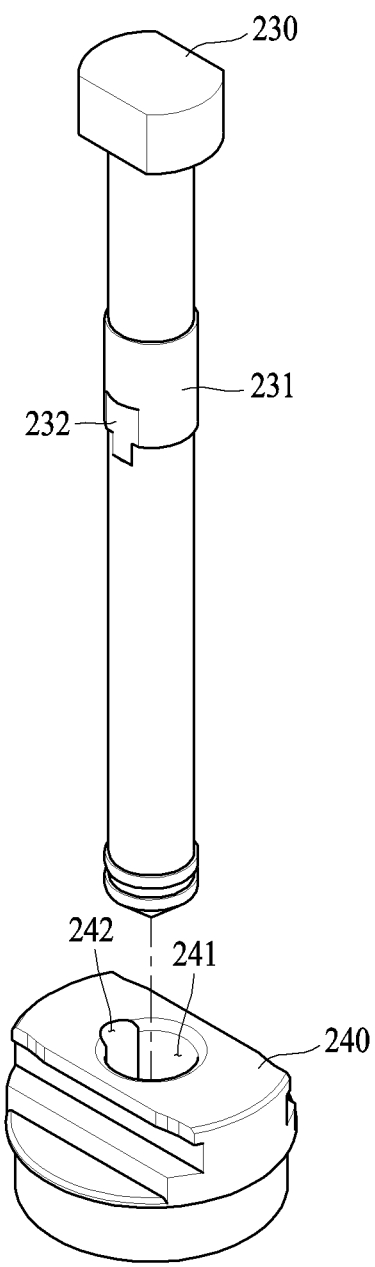
FIG. 6 illustrates a cap and a piston according to another example embodiment.
Figure 7:
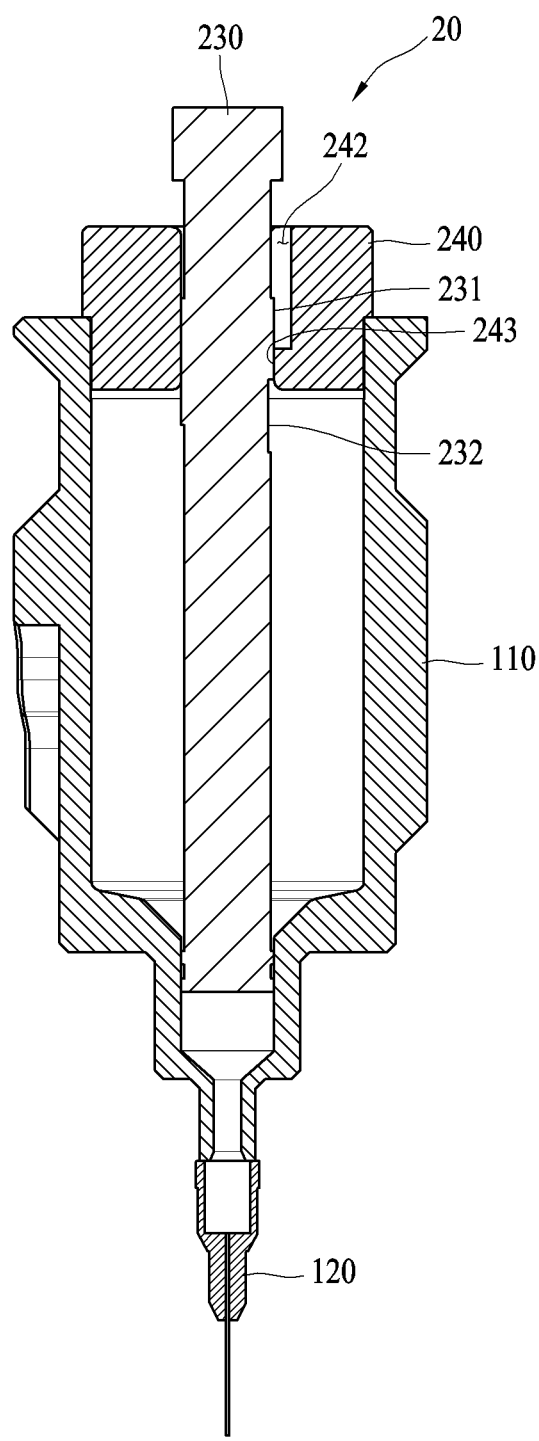
FIG. 7 is a cross-sectional view of a liquid supply apparatus including the cap and piston of FIG. 6.

FIGS. 6 and 7 illustrate a liquid supply apparatus 20 including a piston 230 and a cap 240 according to another example embodiment.

Referring to FIGS. 6 and 7, the liquid supply apparatus 20 may also include the chamber 110 and the injector 120 described above. Therefore, hereinafter, a description mainly refers to the piston 230 and the cap 240.

A first groove 242 may be formed in a portion of an inner side surface of an opening 241 of the cap 240, a third protrusion 231 may be formed along an outer side surface of the piston 230, and a second groove 232 may be formed in a portion of the third protrusion 231.

The first groove 242 may be formed in at least a portion of the inner side surface of the opening 241 of the cap 240. However, the first groove 242 may be formed to extend only to a preset extent from an upper surface of the cap not to a bottom surface of the cap. Therefore, a portion protruding toward the piston may be inevitably formed on a lower portion of the first groove 242 of the cap.

The second groove 232 may be formed in at least a portion of the third protrusion 231 of the piston 230. However, examples are not limited thereto. The second groove 232 may be formed to extend to an outer side surface of the piston where the third protrusion is not formed beyond the portion of the third protrusion 231 of the piston 230.

Hereinafter, an operating status of a liquid supply apparatus including a cap and a piston according to another example embodiment is described with reference to FIGS. 8A through 8E.

Figure 8:
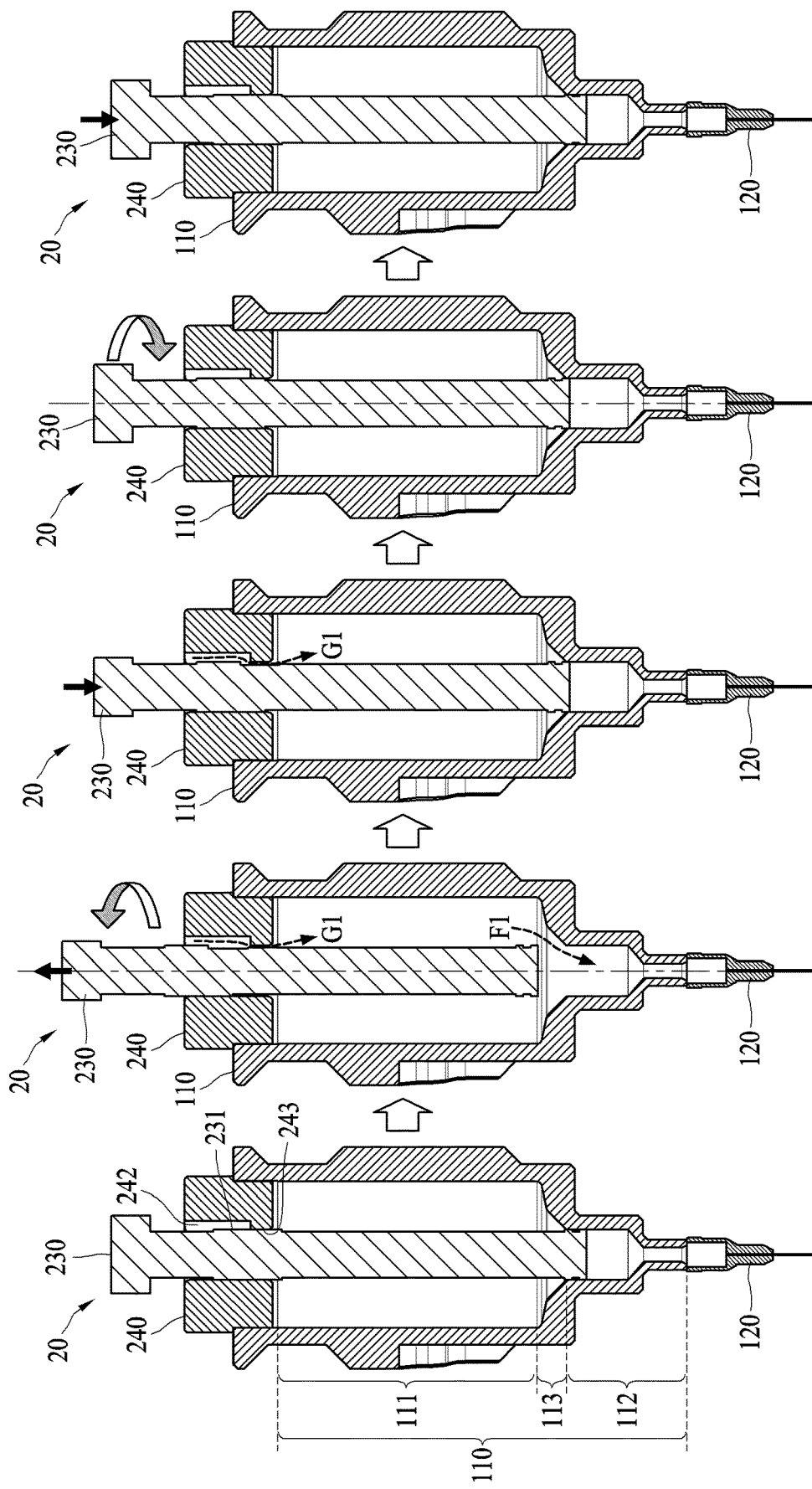
FIGS. 8A through 8E are diagrams illustrating an operating status of the liquid supply apparatus of FIG. 7.

Referring to FIG. 8A, the piston 230 may be disposed at a preset third position with respect to the cap 240. In this case, an outer circumferential surface of a lower portion of the piston 230 may be in contact with an inner side surface of the second area 112. In addition, another portion 243 of an inner side surface of an opening where the first groove 242 is not formed may be in contact with the third protrusion 231 of the piston.

Accordingly, a liquid contained in the first area 111 and the third area 113 may not flow to the second area 112, and a first flow path to be formed between the cap 240 and the piston 230 is blocked, so that a gas may not flow from an outside of a chamber to an inside of the chamber.

Referring to FIG. 8B, as the piston 230 moves upward with respect to the cap 240 while rotating about the axis of the piston 230, the piston 230 may be disposed at a fourth position. In this case, the circumferential surface of the lower portion of the piston 230 may be spaced apart from the inner side surface of the second area 112. In addition, as the first groove 242 and the second groove 232 are disposed in a direction such that they face each other, the first flow path G1 may be formed between the inner side surface of the opening and an outer side surface of the piston.

Therefore, the liquid contained in the first area 111 and the third area 113 may flow F1 to the second area 112, and the first flow path G1 to be formed between the cap 240 and the piston 230 may be in an opened state. The gas may flow from the outside of the chamber to the inside of the chamber via the opened first flow path G1.

Referring to FIG. 8C, as the piston 230 moves downward with respect to the cap 240, the outer circumferential surface of the lower portion of the piston 230 may come into contact with the inner side surface of the second area 112 of the chamber again. Thus, the liquid contained in the first area 111 and the third area 113 may not flow back to the second area 112.

In this position, the first groove 242 of the cap and the second groove 232 of the piston are each still disposed in a direction such that they face each other. Accordingly, the gas may continuously flow from the outside of the chamber to the inside of the chamber via the opened first flow path G1.

Referring to FIG. 8D, as the piston 230 rotates about the axis of the piston 230 to return to the third position, the first groove 242 of the cap and the second groove 232 of the piston may be disposed such that they do not face each other. Thus, the another portion 243 of the inner side surface of the opening where the first groove 242 is not formed may come into contact with the third protrusion 231 of the piston again. The first flow path to be formed between the cap 240 and the piston 230 is in a blocked state again.

Referring to FIG. 8E, as the piston 230 moves further downward below the third position, the lower portion of the piston may be accommodated in the second area 112. Accordingly, a pressing force from movement of the piston may be intensively transmitted only to the liquid contained in the second area 112. The liquid contained in the second area may be sprayed outwardly from the liquid supply apparatus via the injector 120.

Figure 9:
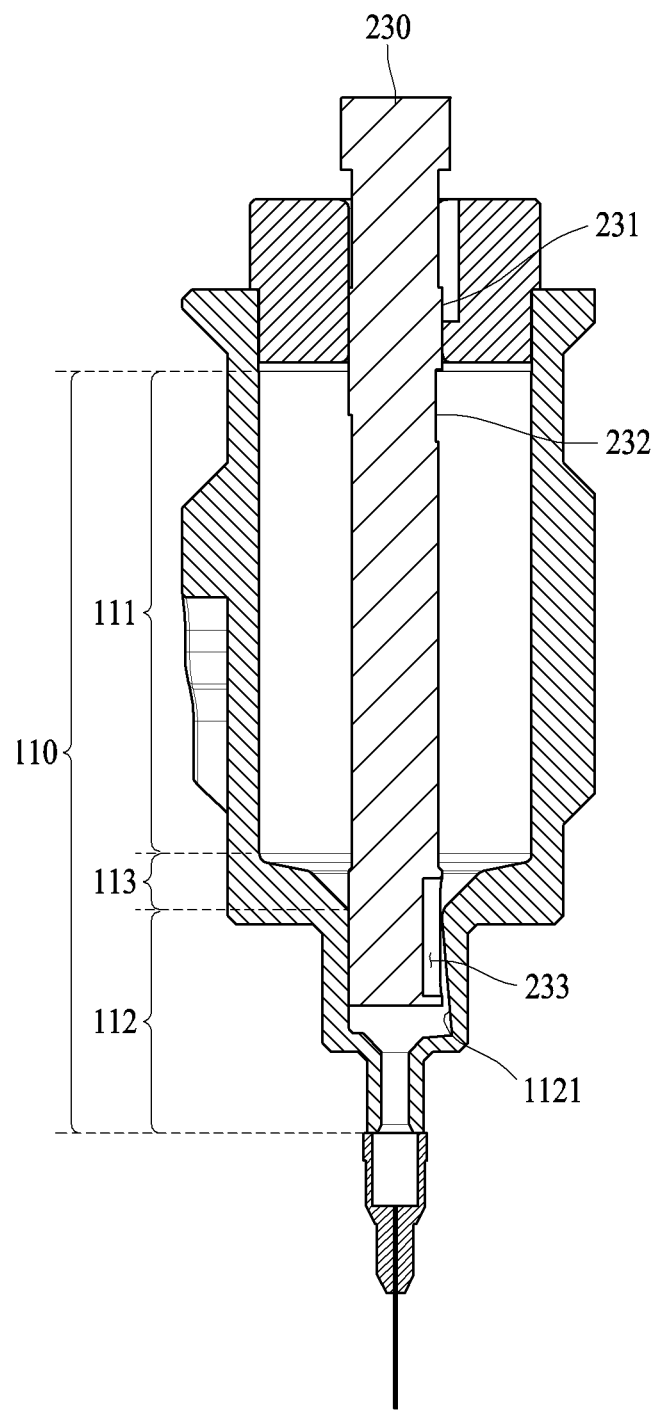
FIG. 9 is a diagram illustrating a lower portion of a piston and a second area of a chamber according to an example embodiment.

Referring to FIG. 9, a third groove 1121 may be formed in a portion of the second area 112 of a chamber according to another example embodiment, and a fourth groove 233 may be formed in a portion of an outer side surface of a lower portion of the piston 230.

Hereinafter, an operating status of a liquid supply apparatus including a piston according to another example embodiment is described with reference to FIGS. 10A and 10B.

Figures 10A, 10B:
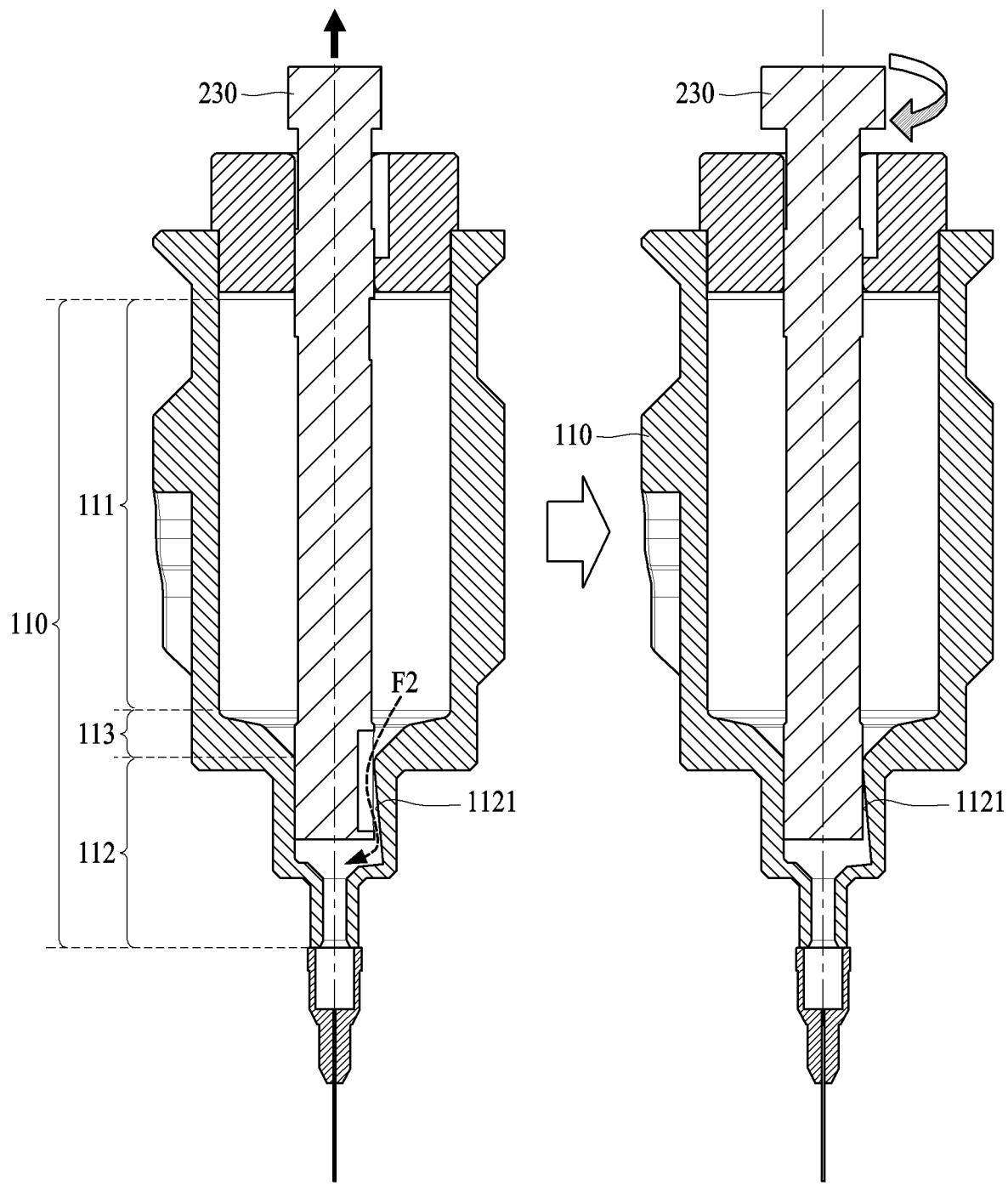
FIGS. 10A and 10B are diagrams illustrating an operating status of a liquid supply apparatus including the piston and chamber of FIG. 9.

Referring to FIG. 10A, the piston 230 may be disposed at a preset fifth position with respect to the cap 240. In a process in which the piston 230 moves upward again after spraying a liquid, the third groove 1121 of the second area of the chamber and the fourth groove 233 of the piston may each be disposed in a direction such that they face each other. As a result, a second flow path F2 may be formed from the third area 113 to the second area 112 via the fourth groove 233.

Thus, even when the piston moves upward in a state of being accommodated in the second area 112, a liquid may easily flow from the first area 111 or the third area 113 to the second area 112 via the second flow path F2.

Referring to FIG. 10B, as the piston 230 rotates about the axis of piston 230, the third groove 1121 of the second area of the chamber and the fourth groove 233 of the piston may be disposed such that they do not face each other.

Accordingly, another portion of an outer side surface of a lower portion of the piston 230 where the fourth groove 233 is not formed may come into contact with an inner side surface of the second area of the chamber again. The second flow path to be formed between the lower portion of the piston 230 and the second area may be in a blocked state again.

Figure 11:
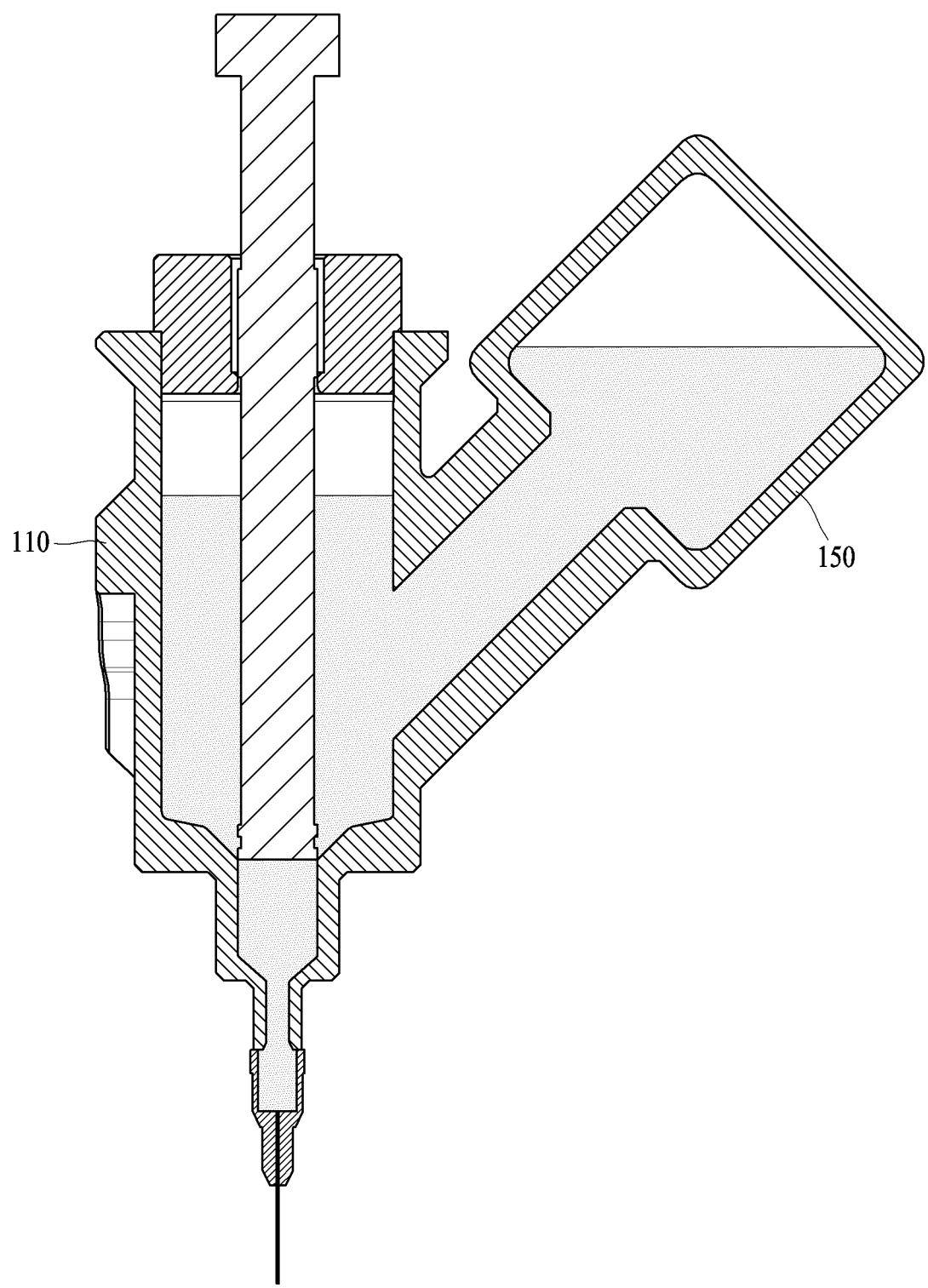
FIG. 11 is a diagram illustrating a liquid supply apparatus including an additional chamber according to an example embodiment.

Referring to FIG. 11, a liquid supply apparatus may further include an additional chamber 150 to be in communication with the chamber 110. Accordingly, an amount of liquid a liquid supply apparatus may contain may be selectively adjusted.

Figure 12:
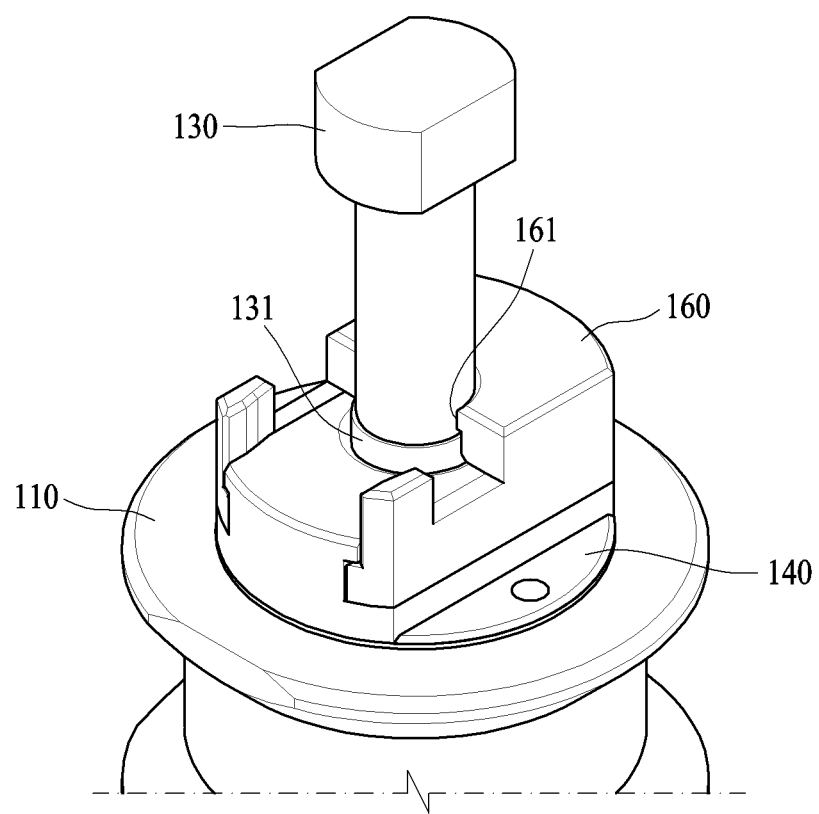
FIG. 12 is a diagram illustrating a cap on which a holder is disposed according to an example embodiment.

Referring FIG. 12, a liquid supply apparatus may further include a holder 160 disposed on an upper side of a cap. A rib 161 extending toward a piston may be formed in the holder 160. The rib 161 may prevent the piston 130 from moving upward with respect to the cap 140 beyond a certain range by being in contact with the second protrusion 131 of the piston.

Accordingly, complete separation of the piston 130 from the cap 140 may be prevented.

Figure 13:
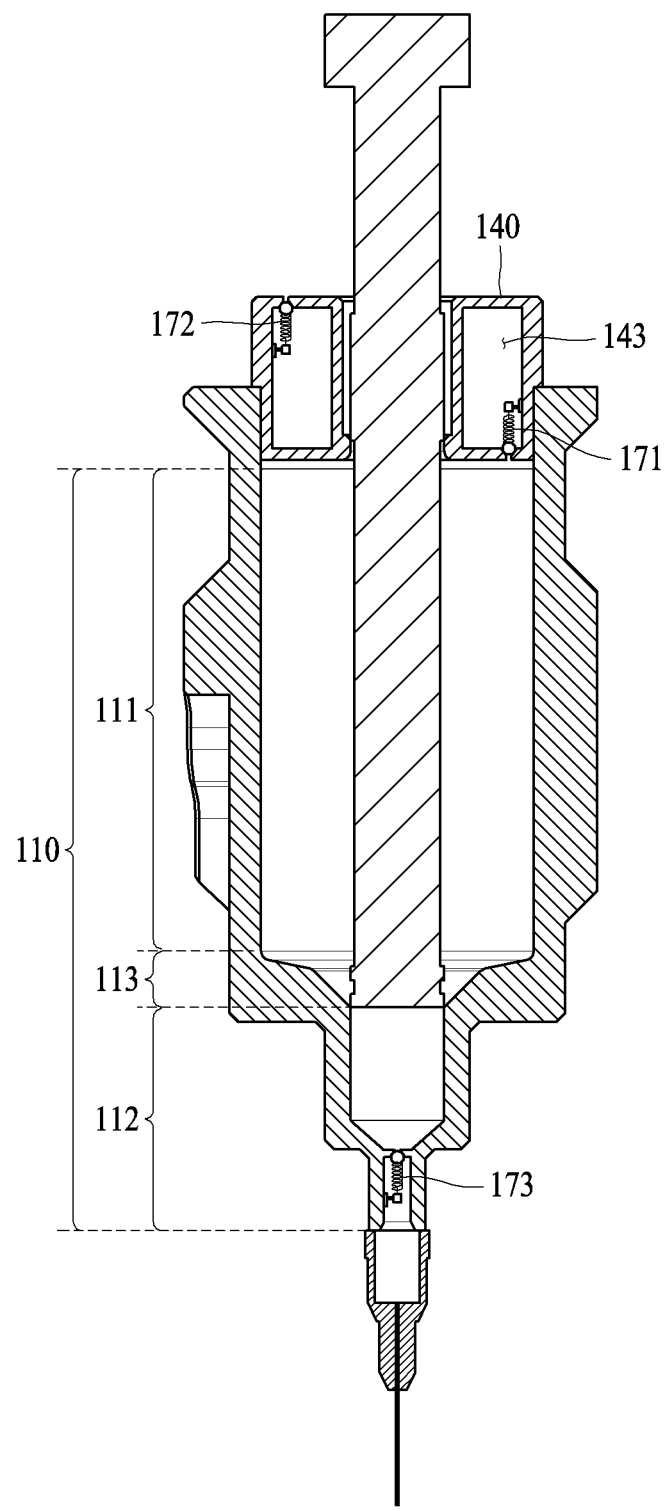
FIG. 13 is a diagram illustrating a liquid supply apparatus including valves according to an example embodiment.

Referring to FIG. 13, an internal storage chamber 143 capable of containing an inert gas may be formed inside the cap 140. A first valve 171 connecting the internal storage chamber 143 of the cap and the first area 111 of a chamber may be included.

The inert gas contained in the cap may flow from the internal storage chamber 143 to the first area 111 through the first valve 171. For example, the inert gas may be nitrogen ($N_2$), but examples are not limited thereto, and other types of inert gas may be used as needed.

Through this structure, as a gas stored in a chamber is sprayed, a volume of an empty space formed inside the chamber gradually increase, and accordingly, the empty space may be filled with an inert gas instead of air. Therefore, purity of liquid may be maintained by injecting the inert gas into the chamber instead of air, which may react with a liquid stored in the chamber and change the liquid.

In addition, a liquid supply apparatus may further include a second valve 172 additionally disposed on an upper end of the cap 140. In response to exhaustion of the inert gas contained in the cap, an inert gas may be supplied to the internal storage chamber 143 of the cap through the second valve 172.

The liquid supply apparatus may further include a third valve 173 disposed on the second area 112 of the chamber 110. The liquid contained in the second area 112 by the third valve 173 may flow in a direction from the second area toward an injector. In addition, a small amount of liquid may be accurately sprayed without being affected by a volume of a liquid stored in an upper side, such as the first area of the chamber, by keeping a pressure of the second area 112 of the chamber higher than atmospheric pressure.

Figure 14:
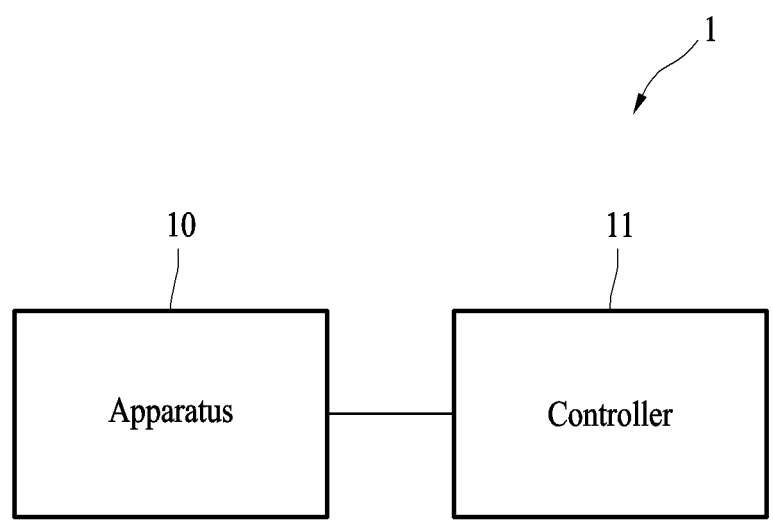
FIG. 14 is a diagram illustrating a liquid supply system according to an example embodiment.

FIG. 14 is a diagram illustrating a liquid supply system according to an example embodiment.

Referring to FIG. 14, a liquid supply system 1 comprises the liquid supply apparatus 10 and a controller 11. The controller 11 is configured to control the liquid supply apparatus 10. The controller 11 is configured to control movement of the piston.

According to an example embodiment, a liquid supply system may include a liquid supply apparatus for spraying a liquid and a controller for controlling the liquid supply apparatus. The liquid supply apparatus may include a chamber including a first area for storing a liquid and a second area for spraying the liquid transferred from the first area, and a piston for applying pressure to the liquid contained in the second area. Movement of the piston may be controlled by the controller.

The liquid supply system may selectively include components of the liquid supply apparatus described above.

In an example embodiment, the liquid supply system may automatically spray a liquid under the control of the controller. In addition, the liquid supply system may not have a separate injector but have a structure in which one side (e.g., a lower side) of the chamber is formed in a nozzle-like shape such that the chamber may directly spray the liquid.

The liquid supply system may be applied to a robot for pharmaceutical manufacturing, food manufacturing, or cooking. However, examples are not limited thereto, and the liquid supply system may apply to various technical fields requiring accurate spraying and controlling of a liquid, including manufacturing fields and surgical equipment fields, as necessary.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A liquid supply apparatus comprising:
   a chamber configured to contain a liquid;
   an injector disposed on a first side of the chamber and configured to spray the liquid;
   a piston extending from a second side of the chamber toward an interior of the chamber; and
   a cap provided on the second side of the chamber and having an opening,
   wherein the chamber comprises:
   a first area configured to store the liquid and having a width; and
   a second area between the first area and the injector and having a width that is less than the width of the first area, wherein a maximum width of a lower portion of the piston is less than the width of the first area of the chamber, wherein the lower portion of the piston is configured to, based on a position of the lower portion, selectively seal the second area from the first area and allow the liquid to transfer between the first area and the second area by the liquid passing by the lower portion of the piston, and press the liquid in the second area to expel the liquid from the liquid supply apparatus, wherein the piston is movably disposed within the opening, wherein the piston is further configured to open or block a flow path, through which a gas is selectively flowable from an exterior of the chamber to the interior of the chamber, by a relative movement of the piston with respect to the cap, wherein a first groove is provided in a first portion of an inner side surface of the opening, wherein the piston comprises a protrusion extending along an outer side surface of the piston, and wherein a second groove is provided in a portion of the protrusion.

2. The liquid supply apparatus of claim 1, wherein the chamber further comprises a third area between the first area and the second area, and wherein a width of the third area decreases from the first area to the second area.

3. The liquid supply apparatus of claim 1, wherein when the piston is disposed at a first position, a second portion of the inner side surface of the opening and the protrusion of the piston contact each other to block the flow path, so that a gas is blocked from flowing from the exterior of the chamber to the interior of the chamber.

4. The liquid supply apparatus of claim 3, wherein when the piston is disposed at a second position, the first groove and the second groove face each other to open the flow path between the inner side surface of the opening and the outer side surface of the piston, so that the gas flows from the exterior of the chamber to the interior of the chamber.

5. The liquid supply apparatus of claim 1, further comprising:

an additional chamber configured to be in fluid communication with the chamber.

6. The liquid supply apparatus of claim 1, further comprising:

a holder provided on an upper side of the cap, wherein separation of the piston from the cap is selectively preventable by the holder.

7. The liquid supply apparatus of claim 1, wherein a maximum width of all portions of the piston that are configured to move within the first area of the chamber is less than the width of the first area of the chamber.

8. A liquid supply apparatus comprising:

a chamber configured to contain a liquid;

an injector disposed on a first side of the chamber and configured to spray the liquid; and a piston extending from a second side of the chamber toward an interior of the chamber, wherein the chamber comprises:

a first area configured to store the liquid and having a width; and a second area between the first area and the injector and having a width that is less than the width of the first area, wherein a maximum width of a lower portion of the piston is less than the width of the first area of the chamber, wherein the lower portion of the piston is configured to, based on a position of the lower portion, selectively seal the second area from the first area and allow the liquid to transfer between the first area and the second area by the liquid passing by the lower portion of the piston, and press the liquid in the second area to expel the liquid from the liquid supply apparatus, wherein the liquid supply apparatus further comprises a cap provided on the second side of the chamber and having an opening, wherein the piston is movably disposed within the opening, wherein the piston is further configured to open or block a flow path, through which a gas is selectively flowable from an exterior of the chamber to the interior of the chamber, by a relative movement of the piston with respect to the cap, wherein the cap comprises a first protrusion extending along an inner side surface of the opening, wherein the piston comprises a second protrusion extending along an outer side surface of the piston, and wherein when the piston is disposed at a first position, the first protrusion of the cap and the second protrusion of the piston contact each other to block the flow path, so that the gas is blocked from flowing from the exterior of the chamber to the interior of the chamber.

9. The liquid supply apparatus of claim 8, wherein when the piston is disposed at a second position, the first protrusion of the cap and the second protrusion of the piston are spaced apart from each other to open the flow path between the inner side surface of the opening and the outer side surface of the piston, so that the gas is-flows from the exterior of the chamber to the interior of the chamber.

\* \* \* \* \*